United States Patent [19]

Frankfort et al.

[11] Patent Number: 4,562,567

[45] Date of Patent: Dec. 31, 1985

[54] APPARATUS FOR CONTROLLING THE WRITE BEAM IN AN OPTICAL DATA RECORDING SYSTEM

[75] Inventors: Eric J. Frankfort, Yorktown Heights; George C. Kenney, II, Ossining; Robert McFarlane, New Rochelle, all of N.Y.

[73] Assignee: North American Philips Corporation, New York, N.Y.

[21] Appl. No.: 440,897

[22] Filed: Nov. 12, 1982

[51] Int. Cl.[4] .............................................. G11B 7/00
[52] U.S. Cl. .................................... 369/106; 369/116; 369/111; 369/54; 346/76 L; 250/205
[58] Field of Search ................. 369/59, 106, 116, 111, 369/53, 54, 58, 120, 121, 122; 346/76 L; 250/205

[56] References Cited

U.S. PATENT DOCUMENTS

| | | | |
|---|---|---|---|
| 4,005,259 | 1/1977 | Kaneko | 369/120 |
| 4,051,329 | 9/1977 | Blondet | 369/116 |
| 4,283,785 | 8/1981 | Miyauchi | 369/106 |
| 4,488,277 | 12/1984 | McFarlane | 369/48 |

*Primary Examiner*—Alan Faber
*Attorney, Agent, or Firm*—Robert T. Mayer

[57] ABSTRACT

Apparatus for recording data by means of a beam of radiation on a recording medium which upon exposure to the beam undergoes optically detectable changes in the form of pits, which apparatus includes means for reducing the beam intensity as a result of pit initiation thereby forming more accurate pits.

6 Claims, 5 Drawing Figures

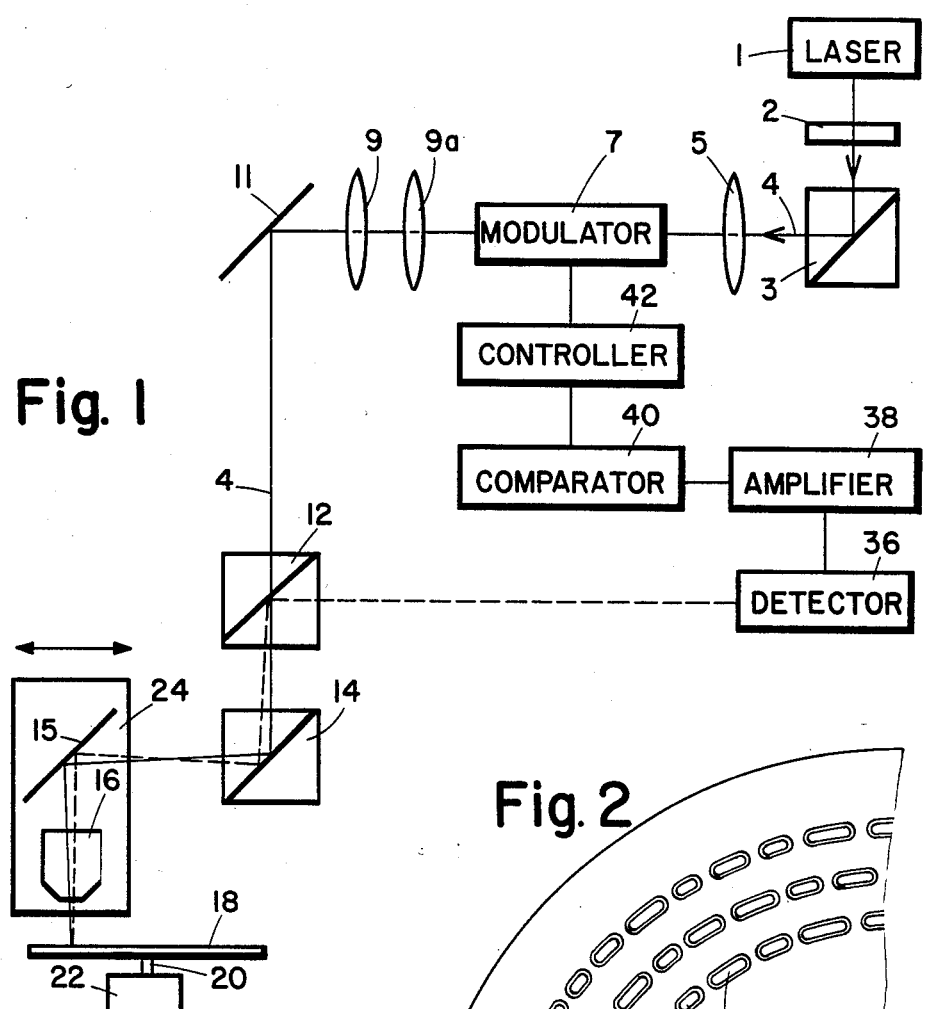
Fig. 1
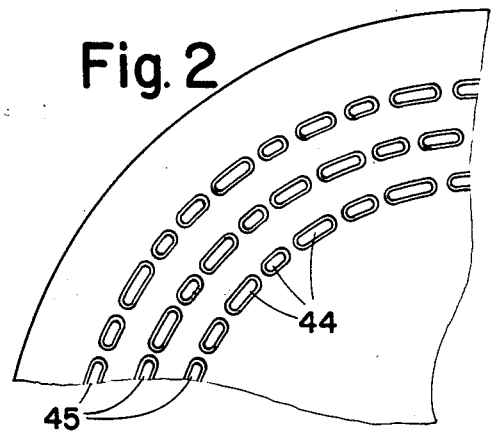
Fig. 2
Fig. 3a
Fig. 3b
Fig. 3c

APPARATUS FOR CONTROLLING THE WRITE BEAM IN AN OPTICAL DATA RECORDING SYSTEM

The invention relates to apparatus for optically recording information on a recording medium with a beam of radiation. In particular, it relates to an apparatus wherein the medium undergoes an optically detectable change upon exposure to the beam.

Application Ser. No. 347,608 now U.S. Pat. No. 4,488,277, filed on Feb. 10, 1982, entitled "Control System for an Optical Data Recording System" and assigned to the same assignee as this application is related hereto.

In known optical recorders, the information is recorded by a laser beam on a recording medium, which typically is a rotating disc provided with a radiation sensitive layer. The intensity of the laser beam is modulated in accordance with the information to be recorded so that the beam forms, on the rotating disc, a series of micron-sized, spaced apart data spots which differ optically from the surrounding medium. Although various types of data registry layers have been proposed, the one most commonly used is a thin, reflective metallic film in which the data spots are pits melted by the laser beam. During recording, the beam is moved radially across the rotating disc so that the data spots are arranged in a plurality of radially spaced tracks.

In an optical recording produced in this manner, the information is encoded in a sequence of data spots and intermediate areas by which the data spots are spaced apart in the track direction. In the case of digital data, for example, a data spot may represent a "one" and an intermediate area or land a "zero" or vice versa. Alternatively, the data to be recorded may be encoded in accordance with one of a number of known encoding schemes in which pulses of different lengths are used to represent specific combinations of data bits. Such signals can then be used to modulate the laser beam so as to form data spots of several different lengths, each length representing a specific combination of data bits. One advantage of such modulating schemes is an increase in the information density of the disc.

The information recorded on the recording medium is read by scanning the tracks with a low intensity laser beam. In the case of a metallic registry layer, for example, the reflectivity of the pits is less than that of the intervening lands. The intensity of the radiation reflected from the disc is, therefore, modulated in accordance with the spatial distribution of the pits and lands along the track enabling the information stored in the pit/land pattern to be recovered upon detection of the reflected radiation.

Various types of error detection correct for errors caused by gross defects in the recording medium. Also, apparatus has been developed to ensure that the data signal is mapped accurately into the spatial pit/land pattern on the disc. For example, in the case of constant angular velocity recording, the linear velocity at the disc periphery is considerably higher than the linear velocity at the disc center. Hence, if the recorded information is to be readout at a constant data rate, the length of a pit representing a given bit or combination of bits will have to be shorter at the central portion of the disc than the length of the corresponding pit at the periphery. The laser power and/or the pulse length of the modulating signal is adjusted in dependence on the radial distance during recording of the information. It is to be understood that pit formation in the disc is a thermodynamic process which depends in a complex way on a large number of parameters such as the energy density and distribution in the write beam, the physical properties of the recording layer, exposure time, the length of the pit that is formed and the like.

During pit formation, the amount of energy needed to initiate a pit is greater than the amount needed to maintain propagation of the pit. Applying a laser of a fixed intensity above the threshold of pit initation to the recording medium for a fixed amount of time proportional to desired pit length can make pits that are both too wide and too long.

It is an object of the invention to improve the accuracy of pit size in optical recordings.

One of the advantages of the invention is that it decreases the error rate in optical recordings.

One of the features of the invention is that it monitors pit formation and reduces laser power during pit propogation after ensuring pit initation.

In accordance with the invention, there is provided apparatus for recording data in a form detectable by a read beam of radiation on a recording medium which comprises a radiation sensitive material. The apparatus comprises means for directing a write beam of radiation onto the recording medium and means for producing relative movement between the write beam and the recording apparatus. Also included are means for modulating the write beam in accordance with the data to be recorded so that the write beam records the data on the recording medium by forming thereon a pattern of spaced apart data spots arranged in an elongated track. In addition, the apparatus includes means for detecting the reflected beam caused by the write beam when it strikes the recording medium; means for determining the strength of the reflected beam and means responsive to the strength of the reflected beam for controlling the strength of the write beam.

Other objects, features and advantages will become apparent, to those skilled in the art from the following description and appended claims when considered in conjunction with the accompanying drawings in which:

FIG. 1 shows an optical recording apparatus in accordance with the invention;

FIG. 2 illustrates a portion of a disc showing the orientation of data spots; and FIGS. 3a, 3b and 3c show waveforms of signals produced by the apparatus of FIG. 1.

In accordance with the preferred embodiment shown in FIG. 1, the apparatus includes laser 1 which produces a plane polarized radiation beam. The laser may, for example, be a HeCd laser emitting about 50 milliwatts at a wavelength of 4416 A. The laser beam is elliptically polarized by a polarizer such as half-wave plate 2. Beam splitting prism 3 reflects polarized write beam 4 toward lens 5.

Write beam 4 is focussed by lens 5 to a narrow beam waist at the input of an acousto-optic modulator 7. The beam emerging from modulator 7 is collimated by lenses 9 and 9a which, in addition, expand the beam so that it fills the objective 14, to be later described. The lenses 9 and 9a, and modulator 7 are arranged so that when the modulator is passive, the light exits at an angle with respect to the optical axis so as to miss the aperture of lens 9a. Upon application of a high frequency electrical signal to the modulator, the light is diffracted along the optical axis and into the aperture of lens 9a. The intensity of the write beam may thus be modulated by exciting the modulator with a series of pulses corresponding to the data to be recorded. The varying intensity of the resulting write beam is proportional to the amplitudes of these pulses.

From lens 9 collimated write beam 4 passes to mirror 11 which directs it to partially transmissive mirror 12. After transmission through mirror 12 write beam 4 impinges on beam splitter 14. Beam splitter 14 reflects write beam 4 onto mirror 15. Mirror 15 reflects write beam 4 through objective 16 which focuses the beam onto disc 18.

Disc 18 is supported on spindle 20 and is rotated by drive motor 22. Objective 16 and mirror 15 are arranged on sled 24, which is mounted in any well known manner for movement radially across disc 18. In a constructed embodiment of the apparatus, an objective with a numerical aperture of 0.68 was used to focus the write beam produced by the HeCd laser to spots of approximately 0.6 um measured at full-width-half-maximum (FWHM). The disc may preferably be of the construction described in U.S. Pat. No. 4,074,282 in which the recording layer is a tellurium alloy film deposited on a clear glass or plastic substrate. A second disc-shaped substrate is hermetically secured in a spaced apart relationship to the first substrate so as to enclose the tellurium alloy film in a dust free atmosphere enabling the recording to be performed without the need for a clean room.

During recording, the intensity of write beam 4 is modulated by A/O modulator 7 which is driven by a multi-level data signal, the "zero" level of the signal corresponding to a land and the levels higher than that which initiates pit formation corresponding to the pits. As stated previously, the NRZ digital data to be recorded may preferably be encoded in accordance with one of a number of coding schemes such that the data signal used to drive the A/O modulator is comprised of pulses of different lengths, each representing a specific combination of data bits.

As write beam 4 is modulated by data, disc 18 is rotated by drive motor 22 so that the beam melts pits 44 (FIG. 2) in the tellurium film. These pits are arranged in tracks 45 around the center of disc 18 as shown in FIG. 2. Optical sled 24 is moved radially across the disc at a uniform rate of speed during writing so that the data tracks are radially spaced from each other and form a continuous spiral on the surface of the disc. Alternatively, the optical sled may be moved radially in discrete steps, one per each revolution of the disc, so that the tracks form a plurality of radially spaced concentric circles. With a 0.6 um write spot, the width of the resultant pits is approximately 0.8 um so that a radial spacing of approximately 1.6 um between the centers of adjacent tracks is sufficient to reduce cross-talk to acceptable levels during readout of the information.

Write beam 4 incident on disc 18 is reflected back through the objective to the mirror 15 which deflects the radiation to the polarization sensitive beam splitter 14. Because of its polarization, the reflected radiation of write beam 4 is directed by element 14 towards mirror 12. This deflects the radiation onto detector 36. The reflectivity of the pits is substantially lower than that of the intervening lands and, therefore, the intensity of the reflected write beam varies in accordance with the pit/land pattern inscribed in the track by the write beam. Moreover, the decrease in reflectivity starts as soon as pit formation is initiated. This phenomenon is used to reduce the write beam intensity during pit propogation.

FIG. 3a shows typical intensity and duration of a write beam that was produced from modulator 7 to form one data pit in the absence of this invention. FIG. 3b represents the intensity and duration of a reflected write beam produced during the formation of one data pit, in the absence of this invention. High reflectivity occurs until the initiation of pit formation starts at point x on the curve. Reflectivity thereafter decreases until it reaches the level at Y which signifies the beginning of the propogation of the hole forming the pit.

FIG. 3c represents typical intensity and duration of a modulated write beam using the invention to form one data pit. As can be seen the intensity of the write beam from modulator 7 is decreased at point z on the curve. This corresponds to the beginning of the propogation of the hole which will form the pit. In this way more accurate pit formation is accomplished.

In order to decrease the intensity of the write beam during pit formation, reflected radiation incident on detector 36, which may be a photodiode or an array of photodiodes, is converted into an electrical signal representative of the intensity of the reflected write beam. This signal is fed to amplifier 38 where it is amplified to obtain an amplified signal. It is to be understood that the response times of detector 36 and amplifier 38 are shorter than the time period of the shortest data bit to be formed. The signal from amplifier 38 is applied to comparator 40 where it is compared to a preset value representing the magnitude of the reflected beam signal at point y on the curve of FIG. 3b. Upon equality comparator 40 produces a signal which is transmitted to controller 42 causing it to decrease the output of modulator 7 as shown in FIG. 3c.

It is understood that various modifications to the above described arrangement of the invention will become evident to those skilled in the art. For example, the system could be made adaptive so that comparator 40 does not employ a preset value but rather one that could be varied in accordance with what experience shows the magnitude of the reflected write beam to be at the beginning of the propagation of the holes which form pits. Also, the system could employ transmissive discs whereupon comparator 40 would compare levels of transmissivity with preset or adaptive values. For that reason, the arrangement described herein is for illustrative purposes and is not to be considered restrictive.

What is claimed is:

1. An apparatus for recording data in a form detectable by a read beam of radiation on a recording medium which comprises a radiation sensitive material, said apparatus comprising means for directing a write beam of radiation onto the recording medium; means for producing relative movement between said write beam and said recording medium; means for modulating said write beam in accordance with the data to be recorded so that said write beam records the data on the recording medium by forming thereon a pattern of spaced apart data spots arranged in an elongated track, said data spots being produced by said write beam forming pits in said radiation sensitive material; means for detecting the reflected beam caused by said write beam when it strikes said recording medium; means for determining the intensity of said reflected beam; and control means responsive to the intensity of said reflected beam for reducing the intensity of said write beam whenever said intensity determining means indicates that pit formation has been initiated.

2. Apparatus according to claim 1, wherein said control means includes a comparator which compares the intensity of said reflected beam with a predetermined intensity and reduces the intensity of said write beam upon a prescribed relationship existing between said predetermined intensity and the intensity of said reflected beam.

3. Apparatus according to claim 2, wherein said detecting means produces an electrical signal responsive to and representative of the intensity of said reflected beam.

4. Apparatus according to claim 3, wherein said comparator compares said electrical signal with a predetermined electrical signal representing said predetermined intensity.

5. Apparatus according to claim 4, wherein said detecting means is a photodiode detector.

6. Apparatus according to claim 5, wherein said control means controls the output of said modulating means.

* * * * *